April 11, 1950     J. R. EARL ET AL     2,503,808
PHOTOELECTRIC AUTOMATICALLY BALANCING POLARISCOPE
Filed Feb. 3, 1948     3 Sheets-Sheet 2
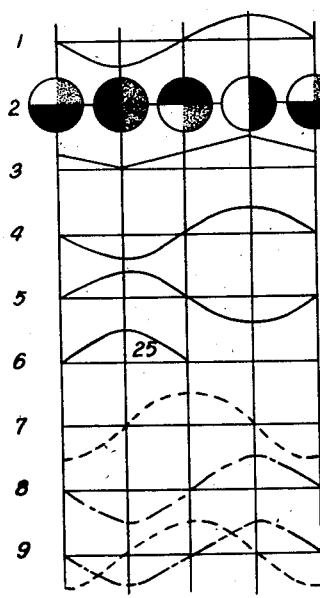
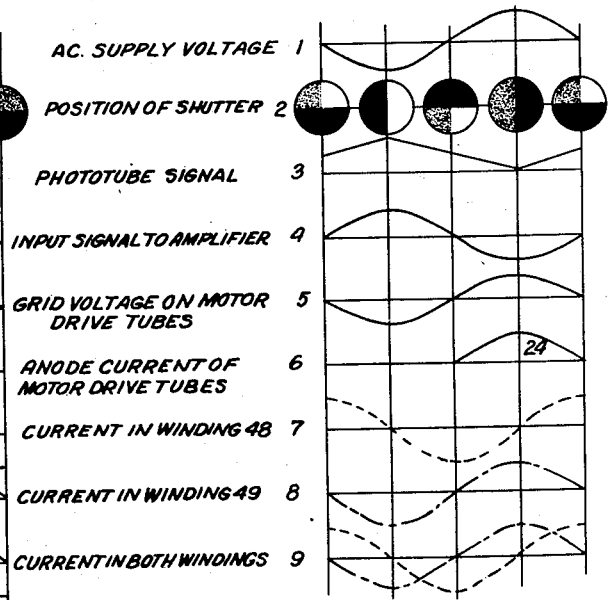
Inventors.
JOHN RODNEY EARL
ERNEST MORRIS HARTMAN
RICHARD ADAMS McGINNIS
OTTO PAUL WALTER BERNHARDT
By
Charles A. Evans
ATTORNEY.

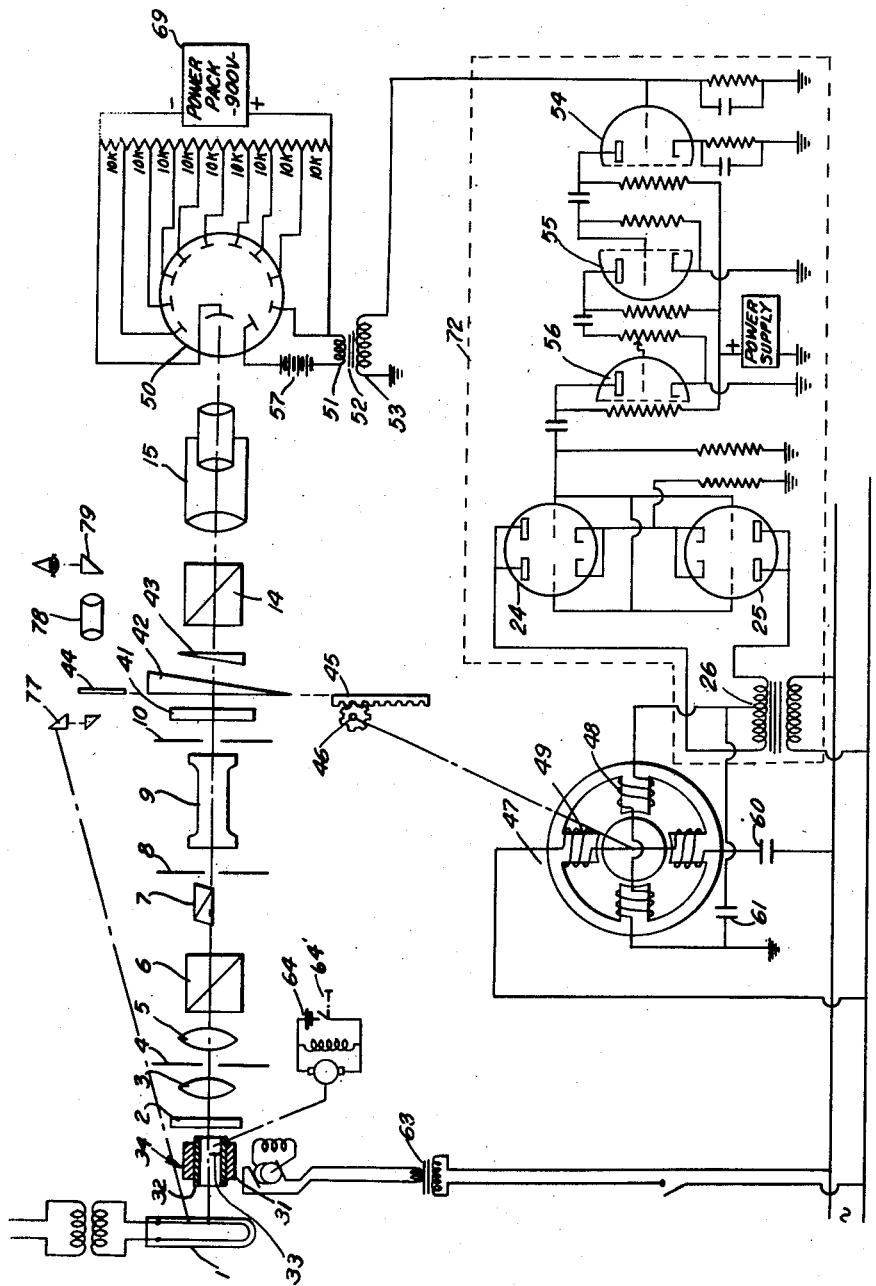

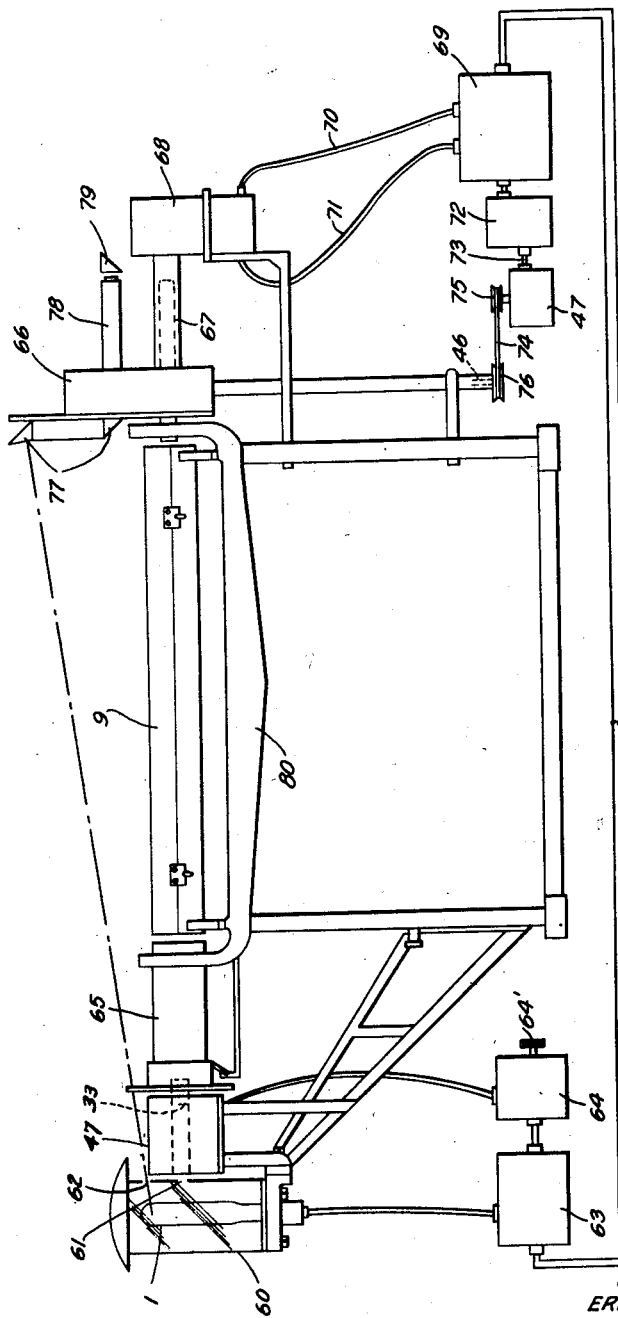

Patented Apr. 11, 1950

2,503,808

UNITED STATES PATENT OFFICE 2,503,808

PHOTOELECTRIC AUTOMATICALLY BALANCING POLARISCOPE

John Rodney Earl, Reno, Nev., and Ernest Morris Hartmann, Spreckels, and Richard Adams McGinnis and Otto Paul Walter Bernhardt, Woodland, Calif., assignors to Spreckels Sugar Company, San Francisco, Calif., a corporation of California Application February 3, 1948, Serial No. 5,968

6 Claims. (Cl. 88—14)

This invention relates to apparatus for measuring the light rotatory power of substances, and particularly to photoelectric means for the self-balancing of photometric apparatus of the polariscope and saccharimeter type used for the quantitative analysis of solutions containing an optically active substance.

In the apparatus of the prior art, measurements of the proportion of optically active substances in solutions were accomplished manually, usually by the use of a polariscope of the half shadow type. With such apparatus, a comparison is made by eye between the intensities of the parts of a divided light beam in the process of adjusting the intensities to equality. With such apparatus, difficulties and disadvantages arise due to certain inherent defects in the characteristics of the normal human eye when applied to this function. Some of these defects arise from the fact that the sensitivity of the eye to the intensity of a light depends upon the eye's previous conditioning; for instance, the eye is the more sensitive to a newly introduced brightness, the lower the brightness to which it was just previously exposed. If the newly introduced brightness is much greater than the previous brightness to which the eye was exposed, a duration of time must elapse before the eye ceases to be dazzled and is at all useful as an accurate part of an optical measuring system.

Due to the necessity of reading the polariscope scale and recording the readings in a notebook, some light external to the instrument must be provided. This light must be kept at as low an intensity as possible in order to reduce to a minimum the loss of time during which the eye is regaining the requisite sensitivity to make an acceptably accurate comparison of the light fields in the polariscope. Because of this, in accurate polarimetry, the measurements must be made in a darkened room, and a period of approximately ten minutes after entry into the room is required for the operator's eyes to reach a substantially constant level of sensitivity. In the darkened room, illumination of the notebook is customarily obtained by small lamp globes operated at subnormal voltage and shielded with red paper. Even under these conditions, a period of at least ten seconds is required for the eye to readapt itself to the polariscope comparing function after each exposure to this light.

Another difficulty incident to the human eye as an indicator for balance in the operation of the polariscope arises in the analyzing of a weakly absorbing sample exhibiting strong rotary power whereby the light passing through the polariscope may be sufficiently intense to cause temporary blindness. In this case, it is necessary to rotate the analyzer to near balance and delay making a measurement until the eye has recovered its sensitivity.

Another difficulty incident to balancing the polariscope by comparing two light intensities by the human eye lies in the fact that experienced personnel is required and even so, consistent personal errors may be expected. In other words, different individuals may show consistent errors in one direction.

Still another difficulty in the manual operation of a polariscope is the necessity for taking a number of readings, usually ten, in order to obtain the probable increased accuracy of an average value. This procedure requires the expenditure of a minimum of approximately ten minutes for the analysis of each sample.

It is an object of this invention to provide photo-electric means for the light intensity comparing function thereby eliminating the difficulties above enumerated incident to the use of the human eye for this function.

It is a further object of this invention to provide photo-electric means in combination with motor means for automatically adjusting the polariscope to the balanced condition.

This invention will be better understood from the following description taken in connection with the accompanying drawings, and its scope will be pointed out in the appended claims.

Figure 1 is a schematic illustration of the preferred embodiment of our invention.

Figures 2A and 2B show a series of diagrams and curves of voltages and currents in different parts of the measuring and control mechanism through a complete cycle.

Figure 3 is a side elevation of the preferred embodiment.

A brief description of the operation of the polariscope utilized in the present invention will facilitate the explanation of the apparatus of this invention.

Referring to Figure 1, we show a horizontal cross section of a polariscope of the saccharimeter type. Light from bulb 1 is passed through a filter plate 2, and lenses 3 and 5. The first lens 3 focuses the image of the light source on the round aperture of first diaphragm 4 which is placed in the focus of the second lens 5 so that a beam of parallel light passes through the rest of the instrument. There are several diaphragms, 4, 8, and 10 in the instrument which limit the diameter of the light beam, and at the same time cause the light field to be circular in shape. After leaving the second lens 5, the light enters polarizer 6, and that portion of the light which is passed through the polarizer along the original direction is plane polarized. One-half of this beam is effectually rotated to a desired angle with respect to the other half and its amplitude reduced by being passed through a small Lippich prism 7 which has its principal section making a small angle with the principal section of the polarizer 6. Other rotating means may be used depending on the type of polariscope.

Of the light from polarizer 6 that reaches polarizer 7, only that component in the plane of the principal section of polarizer 7 passes through. At this point in the instrument, the light beam is now divided into two portions, one-half of which has its plane of polarization modified with respect to the other half. The beam now passes through diaphragm 8 and the solution in the sample chamber 9. The plane of polarization of both parts of the light is rotated to an extent depending upon the optical activity and the concentration of the optically active substance in the solution. The beam of light now emitted is still divided into two portions having the aforesaid different planes of polarization, both of which have been equally rotated to some extent by the optically active substance in the sample chamber. By impressing both portions of the beam of light on an additional polarizer termed the analyzer, that portion having its direction of vibration most nearly parallel to the principal section of the analyzer will pass through with least loss, and if viewed through the eye piece will appear bright while the other half of the light beam will be relatively less bright or in shadow. Previous to the insertion of the optically active sample in the light beam, the principal section of the analyzer is rotated so as to provide equal transmission of the light from each part of the beam. The end view under this condition is equally lighted.

Insertion of a dextrorotatory sample rotates clockwise the plane of vibration of both beams equally so that the component of each beam passed by the analyzer is now unequal and a shadow due to unbalance is seen on the left half of the end view.

Insertion of a laevo-rotatory sample rotates counterclockwise the planes of both beams equally, and in this case, the shadow is on the right half of the end view.

The balancing means are particularly adapted for the purpose of making sugar measurements. A plate of dextrorotary quartz is shown at 41. A pair of laevo-rotary quartz wedges 42 and 43 are provided of which wedge 42 is arranged for translation in a transverse plane. In the normal operation of this instrument, the polarizer 6 and analyzer 14 are stationary, being fixed to give equal half fields in the absence of elements 41, 42, and 43. These are inserted, and when the thickness of 42 and 43 together is equal to 41, the light passes through without rotation. The sugar solution is now interposed, and 42 is moved until equal half fields are again obtained. A transparent indicator 44 is mechanically linked to the movable wedge 41 and provides the means for obtaining readings at balance from which the sugar concentration is determined.

In this embodiment, we employ an amplifier 72 and phase-sensitive motor 47. An electron-multiplier tube 50 such as type 931 is supported so that the light emerging from the instrument impinges on the cathode. A shutter is employed between the light source and the input end of the polariscope in the form of a synchronous motor 34 having a hollow shaft 32 having a semicircular opaque disc 33 on one side of its diameter for the purpose of scanning the half shadow field of the instrument in a plane normal to the optical axis of the instrument. The shutter is rotated at synchronous speed, with respect to the supply current. For a sixty cycle supply, the shutter rotates at 3600 R. P. M. For convenience in adjusting the phase of the shutter with the supply current or timing wave, we rotatably support the stator of the synchronous motor so that the entire motor may be angularly adjusted. The multiplier anodes of the electron multiplier photo-tube can be energized in any manner common in the art, and for this purpose, a conventional high voltage power pack and voltage divider are shown.

The anode voltage source between the output anodes is shown as of the battery type, but any source of well-filtered voltage may be used.

The photo-tube is coupled to an amplifier through transformer 52 although an electronic impedance transformer may be used. The amplifier is of the resistance-capacity coupled type having in the example shown, three voltage amplifier stages, 54, 55, and 56. A sensitivity control in the form of an adjustable one megohm voltage divider couples the grid of the third stage to the anode of the second. The voltage amplifier stages are coupled to motor drive tubes 24 and 25 which may be a plurality of single tubes although we show them as double triode tubes.

For automatically adjusting the polariscope-balancing wedge 42, we employ a phase-sensitive motor. The current produced by the motor drive tubes has a direction depending upon the coincidence of the pulses produced by the photo-electric tube and energization of the anodes of the motor drive tubes from the common source of alternating current. The pulses produced by the photo-electric tube bear a fixed relation to the position of the shutter disc 33 which is driven by synchronous motor 34, likewise energized from the common alternating current source.

By proper adjustment of the parts, the phase sensitive motor 47 rotates in a direction to translate wedge 42 through mechanical coupling means 45 and 46 in a direction to obtain balance; that is, the motor will translate wedge 42 in a direction toward reducing the pulse output of the photo-electric tube, and this action will stop only when the alternating output of the tube is substantially zero.

Referring to Figures 2A and 2B, the effect of unbalanced light fields on the control motor is analyzed.

The condition of a bright left field is assumed in 2A, and a bright right field in Figure 2B. In the former case, the photo-tube voltage is as shown in Figure 2A, curve 3. This voltage is transformed into the form shown in curve 4 and is thus applied to the grid of tube 54. After passing through amplifier tubes 54, 55, and 56 the amplified voltage is applied to the grids of motor-control tubes 24 and 25. The phase of the grid voltage at this point is shown in curve 5 and is seen to be positive during the first half a cycle and negative the last half. During the first half cycle, the tube 25 anode is positive, tube 24 anode is negative, so only tube 25 passes current. During the second half of the cycle, the grids of tubes 24 and 25 are negative, so neither tube conducts regardless of the anode voltage. The amount of current passed by tube 25 is proportional to the grid voltage fluctuations which in turn are proportional to the difference in brightness of the light alternately falling upon the photo-tube.

The half wave current pulses derived from tube 25 are converted into an alternating current of the shape shown in curve 7 by means of capacitor 61 shown in Figure 1 which together with motor winding 48 provides a circuit resonant at the supply current frequency. It follows from the characteristics of a parallel resonant circuit that the current in winding 48 lags the anode current of tube 25 by 90°. This is shown in Figure 2A, curve 7. Winding 49 of the motor is energized from the alternating current supply source, and capacitor 60 is provided so that the current in this winding is in phase with the phase of the supply source.

Therefore, the current wave in winding 49 is as shown in curve 8.

The phase relation of the currents in the two windings is compared in curve 9, and it is seen that the current in control winding 48 leads the current in winding 49. This phase relation makes the motor turn so as to move the quartz wedge 42 in a direction which under the conditions assumed for this explanation reduces its thickness in the path of the light passing through the instrument, i. e., to permit the planes of vibration of the light to turn clockwise.

Figure 2B shows the relations between the phase of the A. C. supply current, the position of the shutter, and the motor current waves when the right field of the polariscope is bright compared to the left field.

The voltage wave from the photo-tube is shifted 180° from its former phase. This results in a shift of 180° in phase in the voltage applied to the grid of tube 54, and likewise, the voltage wave applied to the grid of motor-control tubes 24 and 25. The phase relation between the voltages applied to the grids of tubes 24 and 25 now is such with respect to the anode voltage that only tube 24 is conductive. The current in motor winding 48 lags tube 24 anode current by 90° and accordingly has the phase shown in Figure 2B, curve 7.

The current in motor winding 49 is as shown in curve 8. The two currents are represented in curve 9, and it is seen that now the current in the control-winding 48 lags the current in winding 49. This phase relation causes the motor to turn so as to move the quartz wedge in a direction which under the conditions assumed for this explanation increases its thickness so as to turn the planes of vibration of the light in the polariscope counter-clockwise.

As the motor drives the quartz wedge toward a position such that the amount of light on both halves of the end view becomes equal, the photocell voltage signal diminishes from that shown in Figure 2A or Figure 2B, curve 3. The amplifier output diminishes until substantially no voltage pulses are applied to the grids of tubes 24 or 25, so that although the tubes are so biased as to conduct, the current from both tubes is equal and is a direct current which does not turn the motor; in fact, this direct current is useful for damping the motor to prevent overrunning and hunting.

The physical embodiment of the apparatus described with respect to Figure 1 is shown in Figure 3. Light source 1 is enclosed in a lamp housing 60 which is provided with an aperture 61 aligned with the optical axis of the polariscope. A second aperture 62 in the lamp housing provides a beam of light external of the instrument for a purpose later to become apparent.

Shutter 33 is supported in the hollow shaft of synchronous motor 34. Lamp 1 and synchronous motor 34 may be of any voltage rating, but in the apparatus shown, they are of a low voltage type. To this end a transformer 63 is provided to reduce the line voltage to the required value.

The motor may include a direct current portion which is required to bring the rotating velocity up to synchronous speed. A source of direct current 64 is provided with suitable switch means controlled by knob 64' for applying direct current to the motor 34 to bring it up to synchronous speed.

Polariscope housing 65 encloses elements 2, 3, 4, 5, 6, 7, and 8 shown in Figure 1. Container 9 is the sample chamber. The upper portion of housing 66 contains the scale and vernier plate assembly 44 shown in Figure 1. The lower portion of housing 66 contains elements 41, 42, 43, and 14 of the analyzer assembly.

Casing 67 encloses telescope 15 of Figure 1, and housing 68 encloses photo-tube 50. A power supply 69 is connected to the photo-tube by cable 70. Cable 71 connects the photo tube output to amplifier 72 which contains tubes 54, 55, 56, 57, and motor drive tubes 24 and 25.

Balancing motor 47 is connected to amplifier 72 by cable 73. A belt 74 connects the quartz wedge driving shaft 46 to the motor by means of a pair of pulleys 75 and 76.

The polariscope scale is enclosed in housing 66 and to permit the same to be read, a beam of light originating through aperture 62 of the lamp housing is projected into the housing 66 on to the scale by means of prisms 77. The scale may now be viewed through scale-reading eye piece, 78. A prism 79 supported at the end of the eye piece permits the taking of readings with greater convenience.

The various parts of the apparatus which form parts of the optical system including the phototube are supported rigidly on the instrument frame designated generally by numeral 80.

Having thus described our invention, what we claim is:

1. An adjustable polariscope of the half shadow type having a light field divided into two parts, a phototube supported in the light emerging path thereof; means for passing light alternately through the parts of the divided light field through a polarization selective transmission means onto the phototube; means for simultaneously adjusting the planes of vibration of the light in the two parts of the divided light field so as to obtain equality of emitted light; a reversible motor having a first and a second winding and being coupled to the last mentioned means; an alternating current applied to the first of the motor windings and having a frequency corresponding to the frequency of alternation of the light through the parts of the divided light field, and means responsive to the photo-cell excitation for generating a second alternating current and applying the same to the second winding of said motor, the last mentioned alternating current having the same frequency as the current applied to the first winding but having a phase corresponding with the difference in intensity of light emerging from the parts of the divided light field onto the phototube, whereby the motor is caused to rotate in a direction such as to move the means for simultaneously adjusting the planes of vibration of the light in the two parts of the divided light field until substantially equal light is emitted from the divisions of the light field.

2. In combination with a polariscope having a plurality of light channels, a light source and polariscope adjusting means for adjusting the planes of vibration of the light so as to equalize the relative brightness of the light emitted from the channels; a source of alternating current having a selected frequency, a motor actuated shutter means for admitting light from said light source alternately into said channels at the selected frequency; photoelectric means supported in the path of the emitted light and adapted to generate a current having a frequency of the selected freqeuncy and a phase determined by the phase of the relative intensities of the light emitted alternately from said channels, a reversible electric drive motor having a pair of windings, means for passing said generated current through one of said windings and means for passing current from said source of alternating current through the other of said windings whereby the drive motor is caused to rotate in a direction determined by the phase of the relative intensities of the light impinging on the photoelectric means; and means for coupling the drive motor to the polariscope adjusting means whereby the adjusting means are actuated in a direction to rotate the planes of vibration of the light in the light channels to equalize the light emitted therefrom.

3. In combination with a polariscope having a light path divided into a first half and a second half, a light source supported to direct light into the output end of both halves, means for orientating the planes of vibration of the light in the two halves in different directions, and movable means for simultaneously rotating the planes of vibration of the light in the first and second half of the light path, a source of alternating current having a selected frequency; a synchronous shutter for admitting light from the light source alternately into the first and second half of the light path at the selected frequency and with a constant phase relative to the phase of the alternating current source; photoelectric means supported to intercept the light emitted from the path halves; a polariscope analyzer supported across both light paths and having its plane of polarization orientated to bisect the angle formed by the directions of vibration of the light in the two path halves in the polariscope balanced condition, said photoelectric means adapted to generate a current in the polariscope unbalanced condition having the selected frequency and a reversible phase as determined by the relative magnitude of the angles made by the planes of vibration of the light in the two path halves with respect to the analyzer polarity, a reversible electric drive motor having a pair of windings, means for energizing one of the windings from the alternating current source, and means for energizing the other winding by said generated current, whereby the drive motor is caused to rotate in one direction or the other determined by the difference in size of the aforesaid angles, and means coupling the drive motor to said movable means for simultaneously rotating the planes of vibration of the light in the light path first and second half until the angles between the plane of vibration of the light in each path half and the analyzer plane of polarization are equal in which condition the intensities of the light emitted from each path half are equal whereby the current generated by the phototube becomes substantially constant and the drive motor is not caused to rotate.

4. In combination with a polariscope of the half shadow type having a light path divided into two equal portions, means for plane polarizing in different selected planes the light in the two portions, an analyzer having an index position in which it passes equally the light in both light path portions, a sample chamber for supporting sample substances the light rotating power of which is to be measured, said sample chamber being supported in both light path portions between the means for plane polarizing the light in different selected planes and the analyzer, an adjustable means for rotating the planes of vibration of the light in both path portions for counteracting rotation caused by a sample substance, a light source supported on the optical axis of the polariscope so as to direct light into both path portions, a first alternating current, a synchronous motor propelled by said first alternating current and having a hollow shaft positioned between the light source and the polariscope and aligned with the light axis of the polariscope and having a transverse semi-circular opaque shutter supported therein whereby the light from said source is admitted alternately into the two light path portions in synchronism with said timing wave; photoelectric means supported on the optical axis at the light emitting end of the polariscope and adapted to generate current pulses having a magnitude and phase corresponding to the magnitude and phase of relative magnitude of the light alternately emitted from the polariscope light path portions, translation means for converting said generated pulses into a second alternating current, a phase-sensitive motor having two windings, means for exciting one winding by said first alternating current, and means for exciting the other winding by said second alternating current whereby said motor is caused to rotate in a direction determined by the phase of the relative magnitude of the light alternately emitted from the polariscope with respect to the phase of the first alternating current, and means for coupling the motor to said adjustable means for rotating the planes of vibration of the light in both path portions whereby said adjustable means for rotating the planes of vibration of the light is automatically adjusted to an amount required to counteract rotation of the planes of vibration of the light in the two path portions by a sample substance so that the light from the two path portions is caused to pass through the analyzer equally to thereby terminate the generation of current pulses by the photoelectric means.

5. Photometric apparatus comprising an optical system having two adjacent light channels, means adapted to support a translucent sample substance in both said channels, means in both said channels to polarize the light passing therethrough, means in one of said channels to rotate the plane of polarization of the light passing therethrough to an angle with respect to the light passing through the other channel, means for admitting light alternately in said channels, a polarization selective means supported in the path of both said channels and adjusted with its plane of polarization forming a bisector of the angles of polarization of the light in the two channels under the condition of zero rotation by a sample substance, polarization rotating means for rotating the plane of polarization of the light in both said channels supported in both channels between the support for the sample substance and the polarization selective means, photoelectric means supported in the path of the exit end of both channels and responsive to inequalities between the light emerging alternately from the two channels, an amplifier impressed with the photoelectric means output, and a reversible motor energized by said amplifier whereby it is adapted to adjust said polarization rotating means to compensate for rotation by a sample substance of the polarization plane of the light whereby the amount of compensation is a measure of the rotating power of the sample substance.

6. In combination, a source of light, a polariscope and a photoelectric device, said polariscope having a first and a second light channel, means for supporting said source of light at one end of both said channels and directing the light thereinto, and means for supporting said photoelectric device at the other end of both said channels in the path of light emerging therefrom, a first polarizing element intersecting both said channels for plane polarizing all the light passing therethrough, a second polarizing element intersecting only the first of said channels and adapted to rotate the light in the first channel to a selected angle with respect to the light in the second channel, a third polarizing element supported in both said channels with its plane of polarization directed along the bisector of said selected angle, means for supporting a sample substance in both said channels, adjustable means for rotating the planes of polarization of the light in both said channels supported between said sample substance and the photoelectric device, motor means including a rotating semi-circular shutter supported in the light channels so as to block said source of light from admission alternately into the first and second channel and means responsive to an alternating current generated by said photoelectric device under the condition of inequality in the light alternately emitted from the first and second channel and impinging upon the photoelectric device for adjusting said means for rotating the planes of polarization of the light in both said channels to equalize the angles between the planes of polarization of the light in the two channels with respect to the plane of polarization of the said third polarizing element so that equal light is emitted from both said channels.

JOHN RODNEY EARL.
ERNEST MORRIS HARTMANN.
RICHARD ADAMS McGINNIS.
OTTO PAUL WALTER BERNHARDT.

REFERENCES CITED

The following references are of record in the file of this patent:

UNITED STATES PATENTS

| Number | Name | Date |
|---|---|---|
| 2,076,553 | Drinker et al. | Apr. 13, 1937 |
| 2,107,836 | Pineo | Feb. 8, 1938 |
| 2,376,311 | Hood | May 15, 1945 |
| 2,471,249 | Stearns | May 24, 1949 |

FOREIGN PATENTS

| Number | Country | Date |
|---|---|---|
| 540,876 | Great Britain | Nov. 4, 1941 |

OTHER REFERENCES

Bausch & Lomb Publication—K,, V-25, 5M—Saccharimeter Half-Shadow Type, pages 4 to 7. Published by Bausch & Lomb Optical Company, Rochester, New York.